Jan. 5, 1971     E. J. CRANE     3,551,942
DIVE MECHANISM FOR POULTRY PICKING APPARATUS
Filed May 1, 1969     3 Sheets-Sheet 1

INVENTOR.
EDWARD J. CRANE
BY
ATTORNEYS

Jan. 5, 1971   E. J. CRANE   3,551,942
DIVE MECHANISM FOR POULTRY PICKING APPARATUS
Filed May 1, 1969   3 Sheets-Sheet 2

INVENTOR.
EDWARD J. CRANE
BY
ATTORNEYS

Jan. 5, 1971  E. J. CRANE  3,551,942
DIVE MECHANISM FOR POULTRY PICKING APPARATUS
Filed May 1, 1969

INVENTOR.
EDWARD J. CRANE
BY
ATTORNEYS

United States Patent Office 3,551,942
Patented Jan. 5, 1971

3,551,942
DRIVE MECHANISM FOR POULTRY PICKING APPARATUS

Edward J. Crane, Ottumwa, Iowa, assignor to International Agri-Systems, Inc., Ottumwa, Iowa, a corporation of Iowa
Filed May 1, 1969, Ser. No. 820,826
Int. Cl. A22c *21/02*
U.S. Cl. 17—11.1   8 Claims

ABSTRACT OF THE DISCLOSURE

A drive mechanism for a poultry picker including a spaced seal arrangement with means for permitting the introduction of grease into the open area therebetween at each output shaft. The housing for the mechanism includes a circular protruding flange at each output shaft which flange is received by a comparably sized aperture in the side wall of the picking machine. The flange and aperture are of sufficient size to permit withdrawal of the picking support and fingers attached thereto from the interior of the apparatus through the aperture and, thus, from the back side of the machine.

---

This invention relates to drive mechanisms and, more particularly, to drive mechanisms specifically adapted for powering poultry picking machines.

In the poultry processing field, it has become customary to pick the feathers from the birds by means of one or more mechanical pickers. The pickers, generally include a series of finger supports having flexible fingers mounted thereon which are rotated or otherwise moved in such a manner as to contact the birds and pull the feathers therefrom. The birds are usually conveyed through the picking machines by means of an overhead conveyor, the supports and fingers being positioned at either side of the path of travel such that all areas of the bird will be contacted by the fingers. Alternatively, the birds are sometimes passed along a picking path or the like in free-tumbling fashion. Again, however, the picking supports and flexible fingers are positioned along the path such that the fingers will come periodically into contact with the birds to remove the feathers therefrom.

Picking machines of the type described must incorporate, of course, some mechanism for driving the picking supports. Such mechanisms, heretofore, have taken any of a wide variety of configurations. All, however, have suffered from one or more distinct disadvantages.

One of the more important such disadvantages stems from the fact that it is desirable, ordinarily, during the picking process to spray hot water onto the birds within the picking machines in order to assist in removal of the feathers. This water, of course, contacts the picking supports and has a marked tendency to seep into the drive housings or boxes of the drive mechanism. Such seepage, of course, seriously reduces the life of the power train components since it interferes with the proper supply of lubricant thereto.

Another disadvantage of drive mechanisms and, for that matter, entire machines available heretofore has been the necessity of moving to the interior of the machine along the bird path to remove the picking supports either for replacement of the supports, the flexible fingers attached thereto or to permit removal of the drive mechanism. It is necessary in such a situation, of course, to stop the machine in question and, thus, the entire processing line while the repairs are performed.

In accordance with a first aspect of this invention, a poultry picking apparatus is provided comprising a series of rotatable finger supports with flexible picking fingers mounted thereon. The supports are positioned on the opposite side of the machine side wall from the driving mechanism, the drive shaft communicating from the mechanism to the support through an aperture in the side wall. The aperture in the side wall is of sufficient size to permit passage of the finger support and the attached flexible fingers therethrough whereby the supports can be moved into working position from the exterior of the machine.

According to yet another aspect of this invention, the poultry picking drive mechanism includes a housing with a shaft protruding therefrom. First and second seal members are positioned within the housing in surrounding and sealing fashion with respect to the shaft. The first and second seal members are spaced from one another to define therebetween an open area. Passage means are provided through the housing into said open area through which material such as grease may be forced to fill the area and, thus, retard liquid leakage into the housing.

It is an object of this invention, thus, to provide a novel poultry picking apparatus and drive mechanism therefor which will permit the picking of poultry in a continuous type of operation with maximum efficiency.

It is an object of this invention, more specifically, to provide a poultry picking apparatus and drive mechanism therefor wherein sections of the drive mechanism and those finger supports and fingers attached thereto may be removed from the outside of the picking machine, thus eliminating the necessity for shutting down the machine and adjacent processing equipment because of mechanical failure in the drive mechanism and/or the picking fingers.

It is an object of this invention, in this regard, to provide such an apparatus wherein the drive mechanism and attached supports may be easily and quickly removed from the apparatus and, yet, wherein they are firmly and positively affixed thereto during operation of the apparatus.

It is another object of this invention to provide an apparatus of the type described embodying a novel seal structure effective to prevent positively the seepage of water into the drive mechanism and, thus, wherein drive mechanism failure is minimized.

It is an object of this invention, in this regard, to provide such an apparatus wherein a layer of grease or similar material is utilized as a supplementary seal and, additionally, wherein, even upon dissipation of the grease, the seepage of water into the drive mechanism will be precluded.

It is still a further object of this invention to provide a novel drive mechanism of the type described which can be utilized on either side or at any location in a poultry picking apparatus.

It is an object of this invention, thus, to provide such a mechanism which may be inverted or reversed in position without impairing its functional characteristics.

These as well as other objects of this invention will be readily understood by those skilled in the art with reference to the following specification and accompanying figures in which.

Figure 1:
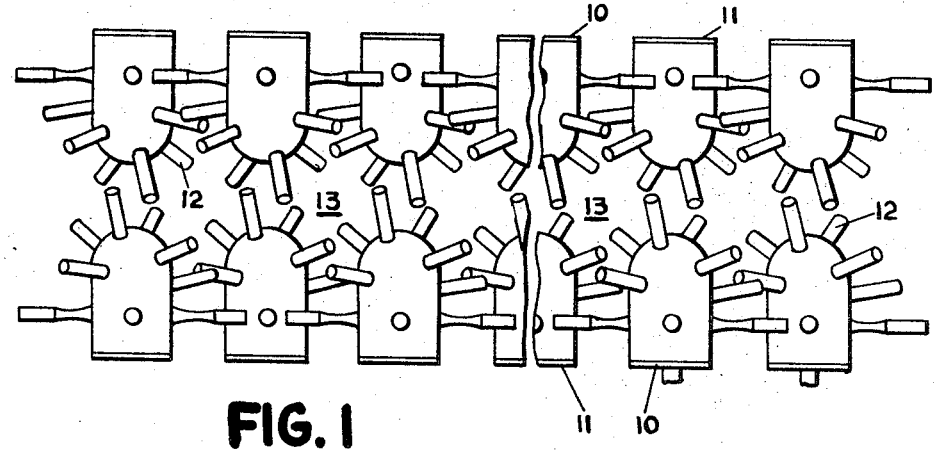
FIG. 1 is a broken, schematic, plan view of an illustrative picking apparatus.
Figure 2:
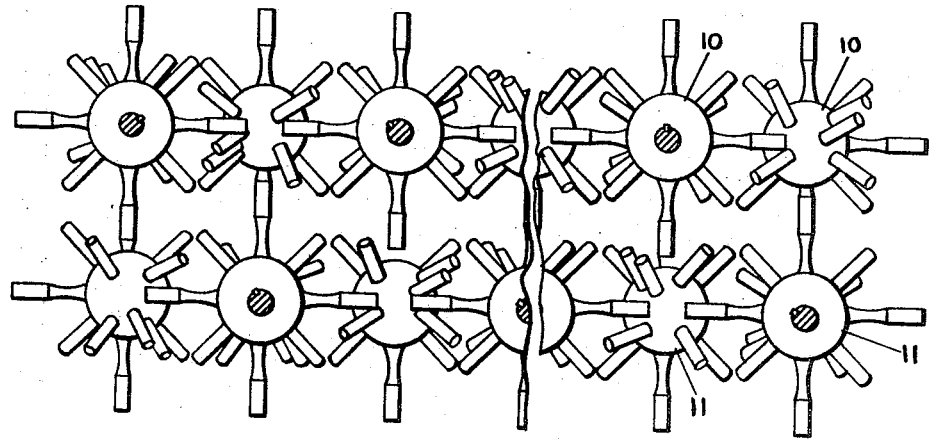
FIG. 2 is a broken, schematic, side view of the apparatus.
Figure 3:
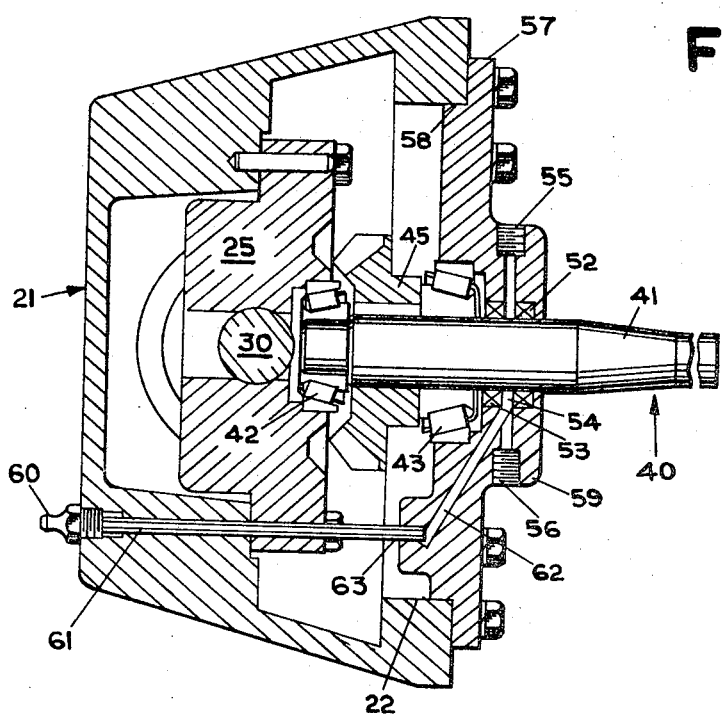
FIG. 3 is a cross-sectional view taken along plane III—III of FIG. 5.
Figure 4:
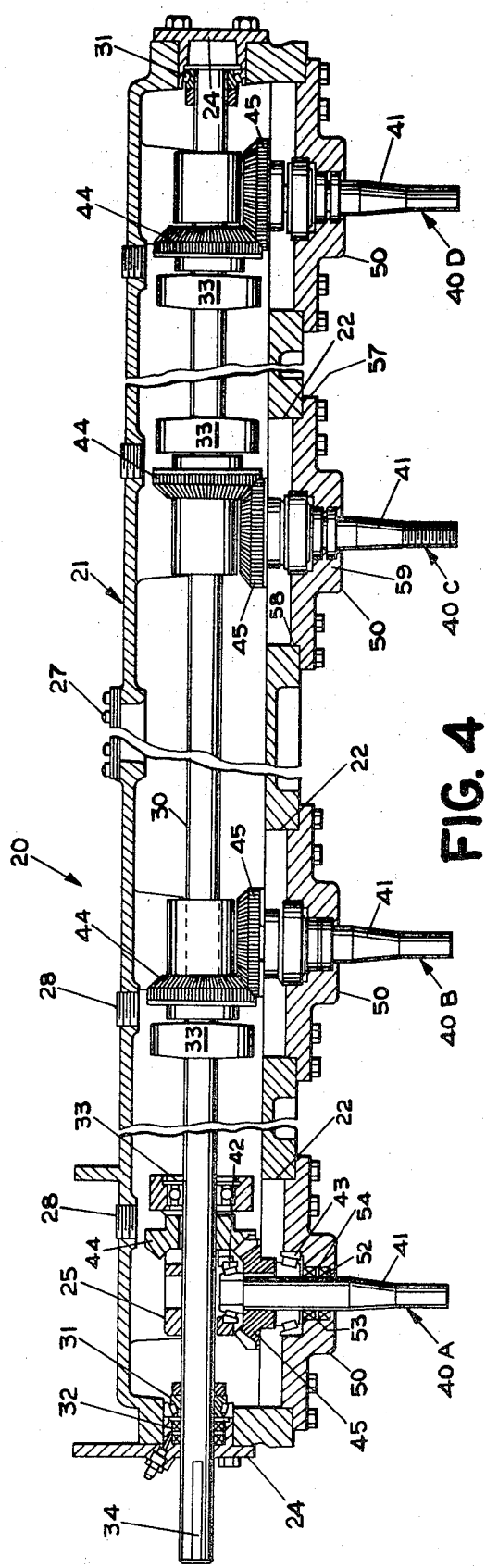
FIG. 4 is a plan view of the drive mechanism, the housing being cut away to illustrate the operative components therein.
Figure 5:
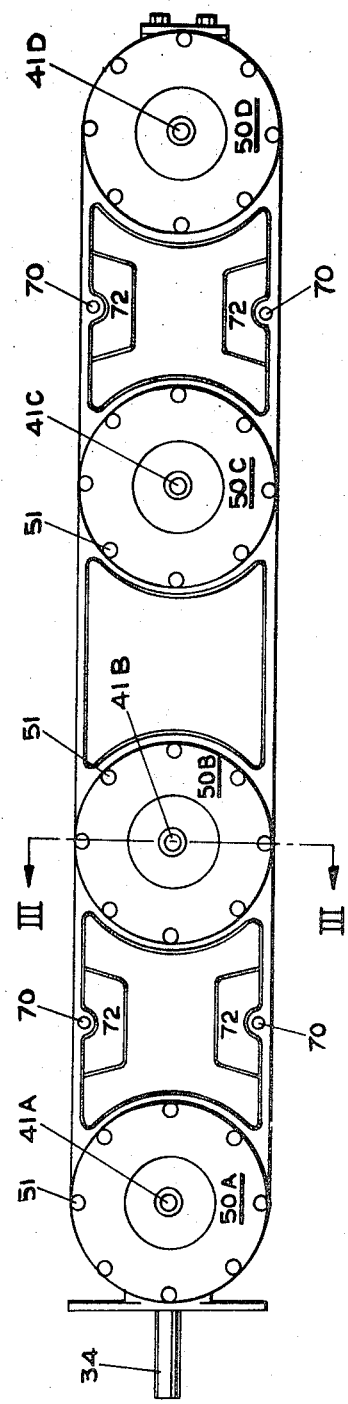
FIG. 5 is a front-elevational view of the drive mechanism.

Referring now to the figures, a preferred embodiment of this invention will be described in detail. FIGS. 1 and 2 illustrate schematically a poultry picking support configuration and arrangement. The path of travel for the poultry to be picked, indicated by the reference numeral 13, is bounded at either side by a series of upper finger supports 10 and a series of offset lower finger supports 11. Each of the supports has affixed thereto in conventional fashion a series of flexible picking fingers 12. The arrangement shown is disclosed in detail and claimed in co-pending application Ser. No. 631,989 filed Apr. 19, 1967, that application being incorporated by reference herein insofar as the poultry picking supports per se and their relationship to the apparatus is concerned.

Noting briefly for purposes of illustration the operational characteristics of the picking structure shown in these figures, the bird is suspended head down from an overhead shackle and conveyed along the path 13. During its travel, it is contacted by the flexible fingers 12 on the various picking supports 10 and 11 and stripped of its feathers. The apparatus includes, of course, a housing having side walls, a top wall, etc., surrounding the picking supports. During operation of the apparatus, alternate of the supports 10 at a single side of the machine are rotated in opposite directions. A similar mode of rotational direction is utilized for the lower supports as described in more detail in the co-pending application referred to above.

Referring now additionally to FIGS. 3 through 6, the drive mechanism, indicated generally by the reference numeral 20, includes an elongated housing 21 which may be cast or otherwise fabricated in conventional fashion. Housing 21 has a series of circular ports or openings 22 spaced along the face thereof. Through the ports, as will be discussed in detail hereinafter, protrude the several shafts upon which the finger supports are affixed.

The housing 21 includes, additionally, end caps 24 and a series of spaced bearing cages or supports 25. The rear of the housing is provided with an inspection window 27 and a series of filler plugs 28 permit the introduction of lubricant into the housing so that the operative components may run in an oil bath.

Rotatably mounted within housing 21 is an elongated power shaft 30. The shaft 30 is rotatably supported at the housing extremities by bearings 31. Two seals 32, positioned relative to one another in a manner to be described hereinafter in detail are positioned at the input extremity of the shaft. The shaft is supported along the length of the housing by a series of bearings 33 suitably affixed to the cages or supports 25. The exposed extremity 34 of shaft 30 has an elongated keyway therein to receive a pulley in conventional fashion by means of which power may be transferred from an electric motor-V-belt or similar arrangement.

There are provided along the length of the housing a series of four power take-off assemblies indicated by the reference numerals 40A, 40B, 40C and 40D. Each assembly 40 includes a shaft 41 tapered at its exposed extremity to receive the finger supports 10 and 11 discussed previously. The shafts are rotatably supported by means of a rear bearing 42 suitably affixed to cage or support 25 and a forward bearing 43 within the cover plate 50 to be discussed hereinafter.

Each of the shafts 40 has affixed thereto within housing 21 a bevel gear 45. Bevel gears 45 mesh with similar bevel gears 44 affixed to the elongated power shaft 30. Where, as with the picker illustrated schematically in FIGS. 1 and 2, it is desirable that adjacent shafts 41 rotate in opposite directions, the arrangement shown may be utilized. If, on the other hand, it were desired to rotate all of the shafts in an identical direction, the bevel gears 44 would all be moved to the same respective side of the gears 45 with which they mesh.

The forward extremities of shafts 41 are supported, as noted previously, through the circular cover plates 50. Each of these cover plates includes an inner circular shoulder 58 receivable into the ports 22, an outstanding circular shoulder 57 which protrudes away from the general face of the housing 21 in circular fashion; and a thickened central area 59 wherein the bearings 43 and seals 52 and 53 are positioned. The cover plates are affixed to the housing by conventional cap screws 51.

Conventional seals 52 and 53 are positioned within the thickened central area 59 of cover plates 50 in spaced relationship with respect to one another so as to define therebetween an open area or space 54. Communicating with open area 54 are two ports 55 and 56 opening to the exterior of the housing. Ports 55 and 56 are spaced approximately 180° from one another and positioned so as to be on the bottom and top of the drive mechanism when it is installed on the picker. The ports, more particularly, are positioned such that regardless of which end of the apparatus the particular drive mechanism is utilized upon, the plug may be removed from the lower one permitting water, or the like which may seep into the open area 54 between seals 52 and 53 to drain therefrom. These ports, ordinarily, are both plugged during shipment and the lower port unplugged when the drive mechanism has been installed on the picking apparatus.

At the rear of the housing 21 behind each of the power take-off assemblies 40 there is positioned a grease fitting 60. Fitting 60 communicates via a tube of nylon or the like through the housing 21 and into a suitable aperture 63 in cover plate 50. Each of the cover plates 50 has machined therein a channel 52 communicating between aperture 63 and the space or open area 54 between seals 52 and 53. Application of grease under pressure at fitting 60, as will be readily appreciated by those skilled in the art, causes the grease to move through tube 61 into channel 62 and, finally, to fill the open area 54 between the two seals. Some of the grease, of course, will escape via the open port (55 or 56) indicating that the interior space has been filled or nearly filled with the material. A hard grease, preferably, is pumped into the open space 54 periodically during utilization of the apparatus to further retard any tendency for water to gain entry into the housing 21 along the shafts 41.

Figure 7:
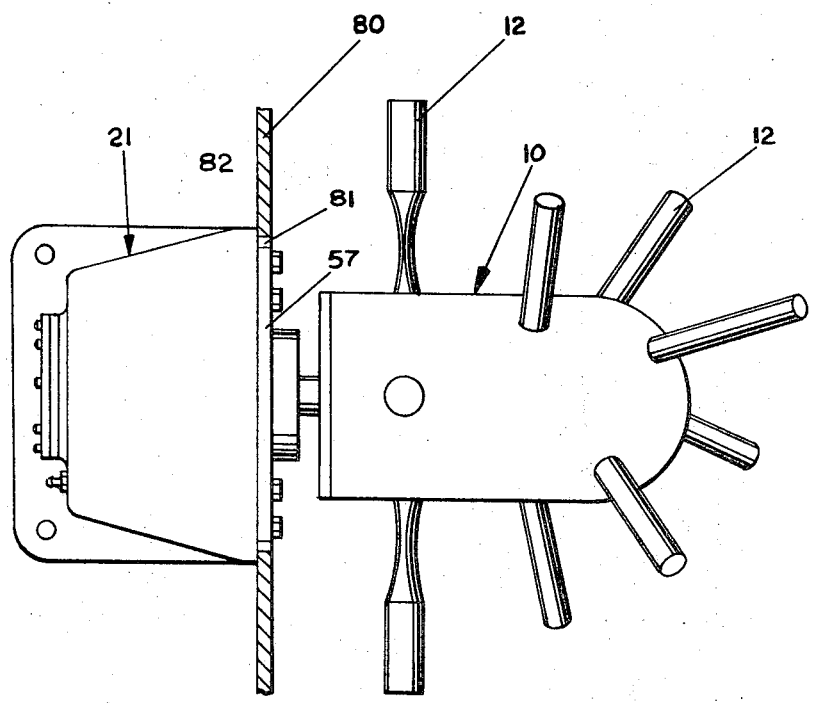
FIG. 7 is a fragmentary, end elevation of the drive mechanism and finger support affixed to the poultry picking apparatus side wall.
Figures 6, 8:
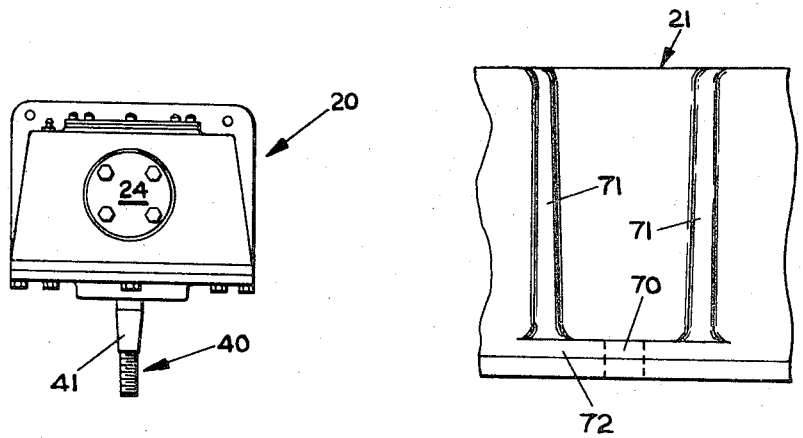
FIG. 6 is an end elevation of the drive mechanism.
FIG. 8 is a fragmentary, plan view of the picker-connection section of the drive mechanism.

Housing 21 is formed so as to include series of generally flat areas 72 (see FIGS. 5 and 8) on the picker abutting surface thereof. The areas 72 are ribbed at 71 on the rear sides and an aperture 70 formed in the faces thereof. Referring now additionally to FIG. 7, the side wall 80 of the picking apparatus is provided with a series of spaced apertures 81 along the sides thereof. The apertures 81 are spaced in accordance with the spacing of the circular cover plates 50 on the drive mechanism 20 and are of a diameter slightly greater than the cover plates.

Because of the relative sizes of aperture 81 and finger support 10, and because of the flexible nature of fingers 12, it is possible to lift one of the drive mechanisms 20 at the exterior side 82 of the machine, bring the four picking supports thereon in alignment with the apertures 81, and force the supports 10 into the interior of the machine in picking position. The circular shoulders 57 on the cover plates 50 are received by the apertures 81 in the side wall 80 of the apparatus and the drive mechanism bolted in position by bolts extending through the apertures 70 in the drive mechanism and suitable receiving means in the side wall 80. The drive mechanism may be withdrawn from the machine, similarly, by merely removing the bolts attaching it to the side wall 80 thereof and pulling the finger supports 10 and flexible fingers 12 attached thereto through the apertures 81 in reverse fashion. The instant invention, thus, provides a means whereby the drive mechanisms 20 and attached fingers and finger supports may be removed from the apparatus from the exterior side thereof, eliminating the necessity of shutting down the assembly line to replace fingers, supports or drive mechanisms for intermittent and usual repair.

Assume, for purposes of explaining the operation of the instant invention, that the drive mechanism 20 is to be utilized on a machine of the type illustrated schematically in FIGS. 1 and 2. Assume, further, that there are provided on the apparatus a series of eight upper picking supports (four on each side) and eight lower supports (four on each side). In such a situation, four individual drive mechanisms 20 are utilized to transmit power to the picking supports.

After the mechanisms have been installed in the manner described, the plug 55 or 56 which is on the bottom (depending upon the location of the particular drive mechanism) is removed. Grease is then injected at fitting 60 to fill as nearly as possible the space 54 between the seals 52 and 53. After the housing 21 has been filled with oil through the plugs 28 therein, power can be applied to the shaft 30 which, in readily understandable fashion, causes the power take-off shafts and, thus, the finger supports attached thereto, to rotate in the relative directions determined by the bevel gear positioning scheme.

As the birds are conveyed along the picking path, they are rubbed by the flexible fingers 12 on the picking supports and the feathers removed therefrom. During the picking operation, as noted previously, scalding water is sprayed throughout the interior of the machine to assist in feather removal. This water, of course, accumulates on the shafts 41 and attempts to leak into the housing 21. Such leakage, in accordance with the concepts of the present invention, is prevented by the spaced seals 52 and 53 operating in conjunction with the grease or other filling material occupying the space 54 and the open port 55 at the bottom of the particular cover plate in question. The grease, of course, will dissipate as the apparatus is utilized but, as will be readily appreciated by those skilled in the art, even if water penetrates the forward seal 52, it will merely pass into open space 54 and drain through the open aperture 55 or 56 therebelow. Leakage into the interior of the housing 21, thus, is positively and redundantly prevented.

During the course of utilization of the apparatus, should any malfunction occur such as the breaking of the flexible fingers 12, a failure in a particular drive mechanism 20 or the like, the drive mechanism in question is merely unbolted from the side wall 80 of the apparatus and drawn out pulling the finger supports 10 and 11 through the apertures 81. As soon as the malfunctioning assembly has been removed, a substitute assembly may be quickly inserted as a replacement or, alternatively, the malfunction in the withdrawn unit remedied and it placed back into operative position in the apparatus.

The interengagement of circular shoulders 57 and apertures 81 supports, of course, much of the weight of the drive mechanisms. This interengagement, additionally, positively positions the drive mechanism with respect to the picking apparatus and, thus, it may be retained in position by the use of relatively few fastening members. This, of course, also facilitates the ready removal and replacement of the drive mechanisms, finger supports and attached fingers.

While a preferred embodiment of this invention has been illustrated in detail, it will be readily apparent to those skilled in the art that other embodiments may be conceived and fabricated without departing from the spirit and scope of this invention. Such other embodiments, for example, can be designed for any specific type of picking apparatus requiring the series of power take-off drives illustrated and the particular physical form of the apparatus in any given environment will depend, of course, on the physical structure of the picker and the picking scheme to be executed.

The embodiments of the invention in which an exclusive property or privilege is claimed are defined as follows.

1. In a poultry picking apparatus having a side wall separating the interior of the apparatus from the exterior thereof; a rotatable finger support with a series of flexible fingers attached thereto positioned on the interior side of said side wall; a drive mechanism positioned on the exterior side of said side wall and an aperture in said side wall wherethrough power is transmitted to said finger support by means of a shaft extending from said drive mechanism, said support being affixed to said shaft, and means retaining the drive mechanism on said exterior side, the improvement comprising the physical dimensions of said aperture being sufficiently large to permit passage of said finger support and the attached flexible fingers therethrough whereby said drive mechanism can be removed for replacement or repair from the exterior of said apparatus.

2. The apparatus as set forth in claim 1 wherein said drive mechanism abuts the exterior side of said side wall and which further comprises means on said drive mechanism receivable within said apertures for stabilizing said mechanism with respect to said side wall when said mechanism and said side wall are abutted.

3. The apparatus as set forth in claim 2 wherein said stabilizing means comprises a shoulder-like member outstanding from the side wall abutting surface of said mechanism, said shoulder having an outer peripheral configuration adapted to fit into and substantially fill said aperture.

4. The apparatus as set forth in claim 3 wherein the configuration of said shoulder-like member and said aperture are such as to permit reception of said member by said aperture when said mechanism is in either of two respectively inverted positions with respect to said side wall.

5. The apparatus as set forth in claim 4 wherein said shoulder-like member and said aperture are circular.

6. In a poultry picking apparatus having a series of rotatable finger supports with flexible picking fingers mounted thereon; a driving mechanism including a casing for transmitting rotatable thrust to said supports; and a side wall, said supports being positioned on one side of said side wall and said driving mechanism on the other, the improvement comprising: an aperture in said side wall for each of said supports, said apertures being of sufficient size to permit withdrawal and insertion of said supports and fingers therethrough; flange means on said casing receivable by said aperture when said mechanism is in abutment with said side wall to stabilize said mechanism with respect to said side wall; and means for securing said mechanism to said side wall.

7. In a drive mechanism having an enclosed lubricant-filled casing particularly adapted for use in proximity to liquids such as water in a poultry picking apparatus, the mechanism including at least one shaft protruding from said casing, the improvement comprising first and second seal means positioned within said casing near the point where said shaft protrudes therefrom, said seal means surrounding said shaft and being spaced from one another to define therebetween an open area, and a drainage port communicating between said open area and the exterior of said casing wherethrough water or the like which has penetrated the outer of said seal means may drain, in combination with a poultry picking apparatus having a side wall separating the interior of the apparatus from the exterior thereof; a rotatable finger support with a series of flexible picking, fingers attached thereto positioned on the interior side of said side wall, said casing being positioned on the exterior side of said side wall, said shaft protruding through an aperture in said side wall and having said support mounted thereon, the physical dimension of said aperture being sufficiently large to permit passage of said finger support and the attached flexible fingers therethrough; and means for removably securing said casing to said side wall.

8. The mechanism as set forth in claim 7 wherein a series of shafts protrude from said casing; wherein a set of said first and second spaced seal means and a drainage port is provided for each of said shafts; wherein one of said finger supports is affixed to each of said shafts; and wherein one of said apertures is provided in said side wall for each said shaft and its attached support.

References Cited

UNITED STATES PATENTS

| | | | |
|---|---|---|---|
| 3,277,515 | 11/1966 | Engkjer et al. | 17—11.1 |
| 3,477,093 | 11/1969 | Zebarth et al. | 17—11.1 |
| 3,483,589 | 12/1969 | Smorenburg | 17—11.1 |

FOREIGN PATENTS

| | | | |
|---|---|---|---|
| 1,111,781 | 5/1968 | Great Britain | 17—11.1 |

LUCIE H. LAUDENSLAGER, Primary Examiner